United States Patent [19]
Nishida et al.

[11] Patent Number: 5,633,725
[45] Date of Patent: May 27, 1997

[54] PHOTO-PRINTING APPARATUS WITH SIMULTANEOUS CONTROL OF PROJECTION EXPOSURE UNIT AND DIGITAL EXPOSURE UNIT

[75] Inventors: Shigeki Nishida; Toru Tanibata, both of Wakayama, Japan

[73] Assignee: Noritsu Koki Co., Ltd., Wakayama, Japan

[21] Appl. No.: 192,284

[22] Filed: Feb. 4, 1994

[30] Foreign Application Priority Data

Feb. 17, 1993 [JP] Japan .................. 5-027827

[51] Int. Cl.$^6$ .............. H04N 1/23; G03B 27/72; G03B 27/52
[52] U.S. Cl. .............. 358/302; 355/20; 355/40
[58] Field of Search .................. 358/302, 296, 358/406, 449, 450, 485, 486, 488, 504, 505, 507; 354/110, 120, 410; 355/20, 40, 54, 77

[56] References Cited

U.S. PATENT DOCUMENTS

| 4,903,068 | 2/1990 | Shiota | 355/20 |
| 4,933,773 | 6/1990 | Shiota et al. | 358/302 |
| 4,951,086 | 8/1990 | Hicks | 355/41 |
| 5,072,253 | 12/1991 | Patton | 355/40 |
| 5,124,742 | 6/1992 | Yoshikawa | 355/77 X |
| 5,151,726 | 9/1992 | Iwashita et al. | 355/40 X |
| 5,184,227 | 2/1993 | Foley | 358/302 |
| 5,400,152 | 3/1995 | Manico et al. | 358/302 X |
| 5,432,579 | 7/1995 | Tokuda | 355/77 X |
| 5,448,377 | 9/1995 | Kinoshita et al. | 358/449 X |
| 5,461,454 | 10/1995 | DeMarti, Jr. et al. | 355/77 X |

FOREIGN PATENT DOCUMENTS 0308967  9/1988  European Pat. Off. .

*Primary Examiner*—Eric Frahm
*Attorney, Agent, or Firm*—Armstrong, Westerman Hattori, McLeland & Naughton

[57] ABSTRACT

A photo-printing apparatus is provided which includes a projection exposure device for projection-exposing an image formed on a film, digital exposure device for exposing a digital image, a reader for reading print size data and image data of one roll of film, and a controller for calculating a digital exposure position on the basis of the print size data and image data read by the reader and conveying a photosensitive material to the digital exposure position, whereby a series of printing operations of the projection exposure device is achieved in parallel with a series of digital printing operations of the digital exposure device.

6 Claims, 3 Drawing Sheets

PHOTO-PRINTING APPARATUS WITH SIMULTANEOUS CONTROL OF PROJECTION EXPOSURE UNIT AND DIGITAL EXPOSURE UNIT

BACKGROUND OF THE INVENTION

The present invention relates to a photo-printing apparatus and, more particularly, to a photo-printing apparatus capable of printing by projection exposure in parallel with printing by exposure of a digital image such as index printing, for one roll of film.

With a conventional photo-printing apparatus, digital printing is unable to be performed during ordinary printing, and vice versa. Therefore, index prints (by digital printing) and ordinary prints are separately exposed and developed for one order of films from a customer. For this reason, manual operations are required to collate the respective images of the index print and ordinary prints with each other to group the prints for each order.

Further, while either of the digital printing and the ordinary printing is performed, the other functions of the apparatus including the printing function for the rest are unable to be used effectively. Moreover, since index prints and ordinary prints must be separately exposed and developed and then the two types of prints are required to be collated with each other for each order, as described above, lengthy operations are needed to complete a series of printing processes.

It is, therefore, an object of the present invention to overcome the foregoing problems and to provide a photo-printing apparatus in which exposure time is remarkably reduced and which avoids wasteful use of a photosensitive material.

SUMMARY OF THE INVENTION

In accordance with the present invention, there is provided a photo-printing apparatus comprising projection exposure means for projection-exposing an image formed on a film, digital exposure means for exposing a digital image, reader means for reading print size data and image data of one roll of film, and control means for calculating a digital exposure position on the basis of the print size data and image data read by the reader means and conveying a photosensitive material to the digital exposure position, wherein a series of printing operations of the projection exposure means is achieved in parallel with a series of digital printing operations of the digital exposure means.

Preferably, the photo-printing apparatus further comprises conveyer means capable of making the photosensitive material partially sagged to stock the same, the conveyer means being disposed between the projection exposure means and the digital exposure means, whereby the photosensitive material is conveyed and projection-exposed during the digital exposure performed by the digital exposure means.

Further, preferably, the photo-printing apparatus might be arranged such that the digital image forms an index print by digital exposure based on the image data of the one roll of film read by the reader means, and that the digital exposure position on the photosensitive material is made continuous to one end of a series of projection-exposed prints of the one roll of film.

In the photo-printing apparatus (hereinafer referred to as "printing apparatus" for simplicity) of the present invention, frames of a film can be sequentially projection-exposed while at the same time the photosensitive material is digital-exposed for the frames of the film at respective calculated exposure positions of the frames. Since the digital exposure position on the photosensitive material is controlled on the basis of the size data of prints to be obtained by projection exposure, an exposure for, for example, an index print of one order can be performed so that the index print would be positioned continuous to either a front end or a rear end of a series of ordinary prints of the same order.

DETAILED DESCRIPTION

Figure 1:
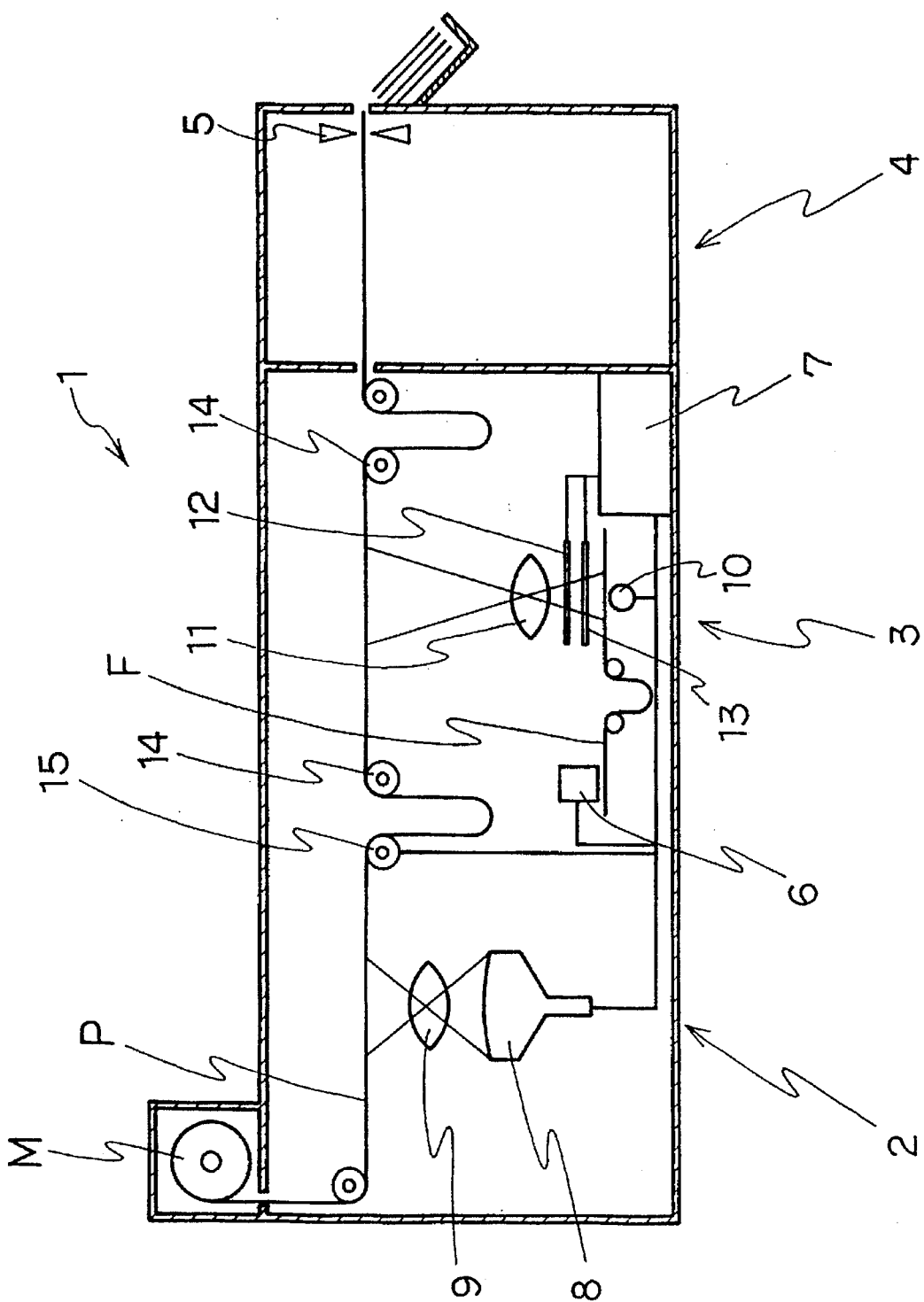
FIG. 1 is a schematic sectional view showing one embodiment of a photo-printing apparatus according to the present invention.

Referring to FIG. 1, numeral 1 denotes a printing apparatus in which a magazine M of a photosensitive material (hereinafter referred to as "photographic paper") P and one roll of film F having been developed are placed in position. The printing apparatus 1 includes a digital exposure part 2, projection exposure part 3 and development part 4. The photographic paper P, long in length, is drawn out from the magazine M, sequentially fed through the digital exposure part 2 and projection exposure part 3 to the development part 4, and finally cut to a predetermined print size by means of a cutter 5.

A film data reader (hereinafter referred to as "reader") 6 is disposed as facing opposite to the film F. The image data and print size data of the film F which are read by the reader 6 are transmitted to a control part 7 having a built-in CPU.

The digital exposure part 2 includes a cathode ray tube (hereinafter referred to as "CRT") 8 and lens 9 for digital exposure. The control part 7 controls the exposure operations of the CRT 8 according to digital exposure data calculated from the aforesaid film image data. A digital exposure position on the photographic paper P is controlled by the control part 7 according to digital position data calculated from the aforesaid print size data. Specifically, the photographic paper P is conveyed to a predetermined position by means of a loop control roller 15 to be described later.

The projection exposure part 3 includes an exposure lamp 10 disposed below the film F, a lens 11 disposed above the film F, and a shutter 12 and a light-regulating filter 13 both disposed between the film F and the lens 11. In performing projection exposure while feeding the photographic paper P by each frame by means of a conveyer roller 14, the aforesaid control part 7 controls the feed of the photographic paper P according to a predetermined format based on the aforesaid print size data, that is, a regular size (for example, the so-called E-size has 89 mm in length and 127 mm in width and the so-called L-size has 82.5 mm in length and 120 mm in width), a panorama size (89 mm in length and 254 mm in width), high-vision size (the ratio of length to width is 9:16, for example, 89 mm in length and 158 mm in width) and the like. At the same time therewith, the control part 7 also controls the magnifying power of the lens 11, the exposure intensity and shutter speed based on the film image data, and the selection of a filter.

The loop control roller 15 is disposed between the digital exposure part 2 and the projection exposure part 3. The provision of this loop control roller 15 is for avoiding adverse effect on the digital exposure simultaneously carried out with the projection exposure when the photographic paper P is conveyed. Specifically, in order to perform the projection exposure of the photographic paper P fed one by one frame in parallel with the digital exposure which does not require the photographic paper P to be moved at all, the loop control roller 15 serves to stock a portion of the photographic paper P as having a length required for projection exposures for several frames by sagging (like looping) it. The length of the photographic paper P to be stocked is controlled by the control part 7 according to the print size data. Note that as described earlier, the loop control roller 15 is also used in controlling the digital exposure position. With the printing apparatus 1 of the present embodiment, a digital print, such as an index print, succeeds with the last of print the ordinary prints on the photographic paper P.

The development part 4 might be a conventionally known one.

Figure 2:
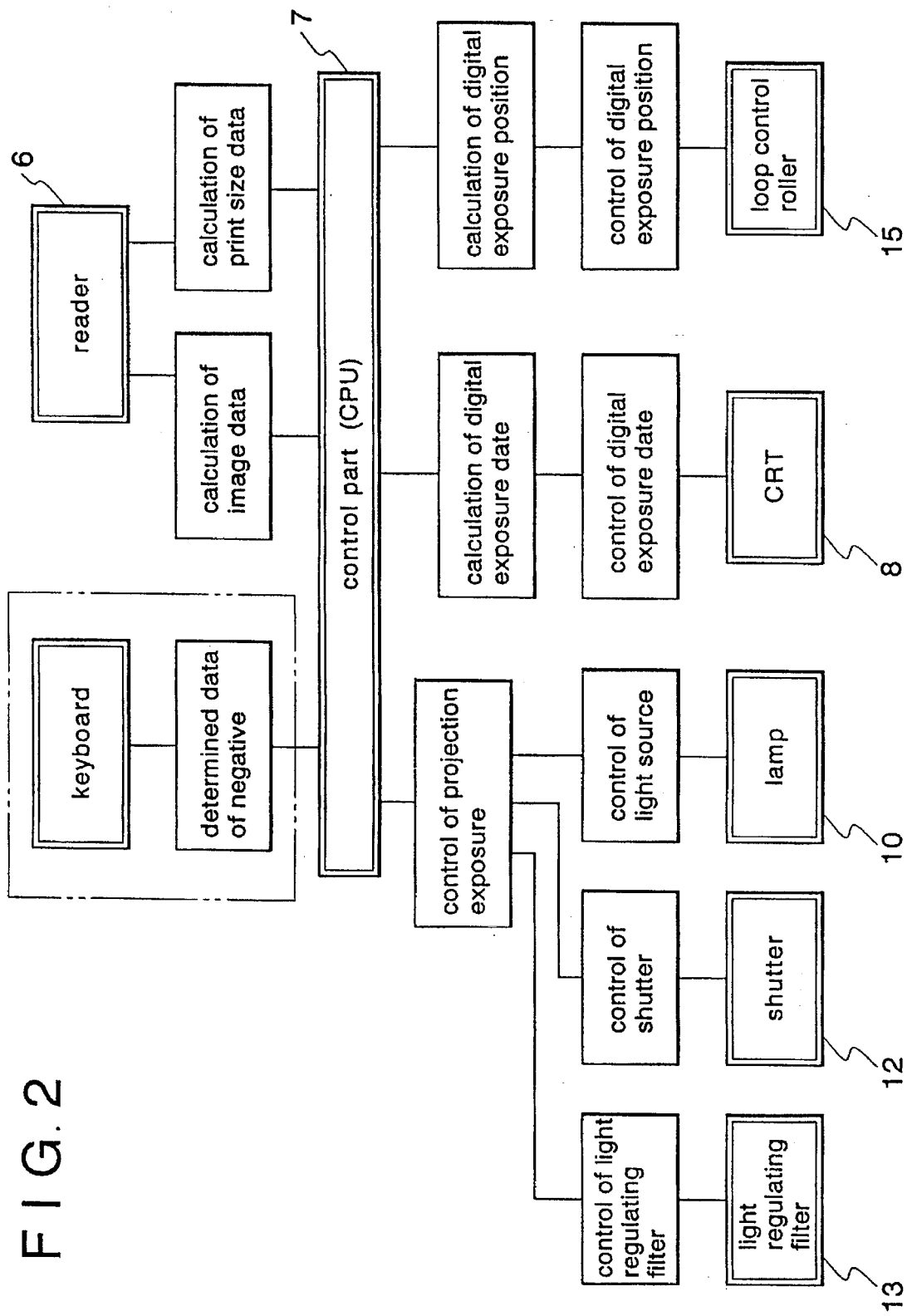
FIG. 2 is a block diagram showing how the photo-printing apparatus of FIG. 1 is controlled.

To be described next with reference to FIG. 2 is the printing control over the printing apparatus 1 thus arranged. In FIG. 2 the components in double frame are those constituting the printing apparatus 1.

As shown in FIG. 2, firstly, the reader 6 reads film data of all the frames of one roll of developed film and then calculates image data and print size data from the film data for transmitting them to the control part 7.

It should be understood that although the reader 6 is also used to calculate projection exposure conditions in the aforementioned embodiment shown in FIG. 1, the present invention is not limited to such an arrangement. Instead of using the reader to automatically read and calculate the data, an operator might determine the projection exposure conditions such as the density of a negative and input the determined data to the CPU of the control part 7 through a keyboard (enclosed in chain double-dashed line in FIG. 2). Nevertheless, the following description is directed to the case where the reader 6 is used therefor.

The control part 7 calculates a digital exposure position from the aforesaid read print size data and causes the loop control roller 15 to convey the photographic paper P so as to be exposed at that position. In parallel therewith the control part 7 calculates the digital exposure data from the image data input and causes the CRT 8 to perform exposure at the digital exposure position thus determined on the photographic paper P according to the digital exposure data.

While controlling the digital exposure, the control part 7 also controls the projection exposure according to the aforesaid image data. Specifically, the control part 7 selects a light regulating filter, sets the shutter speed of the shutter 12 and adjusts the light quantity of the lamp 10, for each frame of the film F.

Although not shown in FIG. 2, the conveyer roller 14 is controlled by the control part 7 so as to convey the photographic paper P by each frame for the projection exposure.

Figure 3:
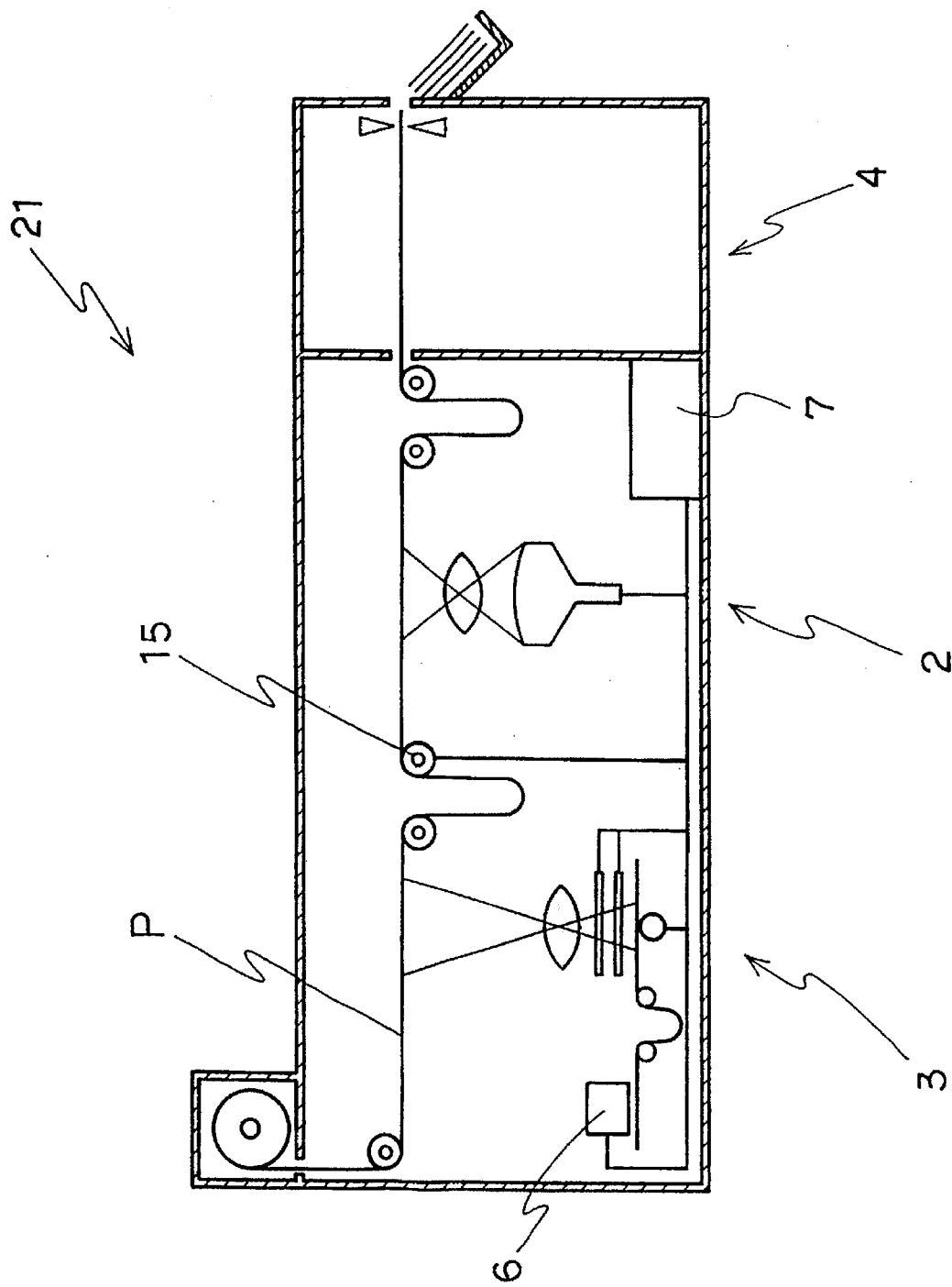
FIG. 3 is a schematic sectional view showing another embodiment of a photo-printing apparatus according to the present invention.

Referring next to FIG. 3, a printing apparatus 21 according to another embodiment of the invention has digital exposure part 2 and projection exposure part 3 which are located reverse of those in the printing apparatus 1 shown in FIG. 1. That is, the projection exposure part 3 is disposed upstream of the path of the photographic paper P, while the digital exposure part 2 is disposed downstream of the path. This printing apparatus 21 exhibits the same functions as the foregoing embodiment shown in FIG. 1 except that the digital print (for example, index print) appears on the front end side of the ordinary prints on the photographic paper.

Although the digital print image to be subjected to the digital exposure is in the form of an index print in the foregoing description, the printing apparatus of the present invention can use the digital print image in any other form without particular limitations. The digital print image might be, for example, an image processed by an image processing part (not shown) according to data obtained by scanning an image on a film or an image taken with a still camera.

According to the present invention, the digital printing and the ordinary printing based on the projection exposure can be performed in parallel with each other with respect to a continuous photographic paper. Stated otherwise, the time period for the digital printing is completely absorbed by that for the ordinary printing for several frames. Accordingly, if the index printing, for example, is conducted based on the digital exposure, it can be achieved in parallel with the ordinary printing for the same order of a customer. Hence, the time period for printing operation can be remarkably reduced, and there can be omitted lengthy and troublesome operations, which are conventionally required after the printing operation, for collating ordinary prints with an index print and sorting these two kinds of prints for each order. In addition, since a position at which the digital exposure is to be performed is calculated from the print size of ordinary prints, two kinds of exposures can be performed in parallel with each other without wastefully using a photosensitive material to be exposed and with no possibility of producing overlapped images.

While only certain presently preferred embodiments have been described in detail, as will be apparent with those familiar with the art, certain changes and modifications can be made without departing from the spirit and scope of the invention as defined by the following claims.

What is claimed is:

1. A photo-printing apparatus comprising:
   projection exposure means for projection-exposing an image formed on a film,
   digital exposure means for exposing a digital image,
   reader means for reading print size data and image data of one roll of film, and
   control means for calculating a digital exposure position on the basis of the print size data and image data read by the reader means, for conveying a first part of a continuous photosensitive material to a projection exposure position and a second part of the continuous photosensitive material to a digital exposure position, and for controlling printing operations of the projection exposure means to the first part of the continuous photosensitive material at the projection exposure position simultaneously with controlling printing operations of the digital exposure means to the second part of the continuous photosensitive material at the digital exposure position.

2. The photo-printing apparatus of claim 1, further comprising conveyor means for partially sagging the continuous photosensitive material to stock the continuous photosensitive material, said conveyor means being disposed between said projection exposure means and said digital exposure means, and wherein said control means controls said conveyor means, said projection exposure means and said digital exposure means to convey said continuous photosensitive material and projection-expose simultaneously with digital exposure.

3. The photo-printing apparatus of claim 1 or 2, wherein said digital exposure means exposes a digital image of an index print by digital exposure based on said image data of the one roll of film read by the reader means, and wherein said control means controls the conveyance of the continuous photosensitive material so that the second part of the continuous photosensitive material is made continuous with one end of a series of projection-exposed prints of said one roll of film.

4. The photo-printing apparatus of claim 2, wherein said conveyor means, controlled by said control means, partially sags the continuous photosensitive material in an amount of equal to the amount of photosensitive material necessary to expose n images on separate areas of the continuous photosensitive material, where n is an integer, and wherein said digital exposure means exposes an index print of the n images.

5. The photo-printing apparatus of claim 4, wherein said conveyor means partially sags the continuous photosensitive material in an amount necessary to expose all frames of the film, wherein n equals the number of frames of the film.

6. A photo-printing apparatus comprising:
projection exposure means for projection-exposing an image formed on a film,
digital exposure means for exposing a digital image,
reader means for reading print size data and image data of one roll of film, and
control means for calculating a digital exposure position on the basis of the print size data and image data read by the reader means, for conveying a first part of a continuous photosensitive material to a projection exposure position and a second part of the continuous photosensitive material to a digital exposure position, and for controlling said projection exposure means to expose the first part of the continuous photosensitive material at the projection exposure position simultaneously with controlling said digital exposure means to expose the second part of the continuous photosensitive material at the digital exposure position.

* * * * *